(12) United States Patent
VanBuskirk et al.

(10) Patent No.: US 11,767,107 B2
(45) Date of Patent: Sep. 26, 2023

(54) SYSTEM AND METHOD FOR VIBRATORY MOTION REDUCTION FOR A PYLON ASSEMBLY

(71) Applicant: TEXTRON INNOVATIONS INC., Providence, RI (US)

(72) Inventors: Matthew Carl VanBuskirk, Roanoke, TX (US); Michael Scott Seifert, Southlake, TX (US)

(73) Assignee: TEXTRON INNOVATIONS INC., Providence, RI (US)

(*) Notice: Subject to any disclaimer, the term of this patent is extended or adjusted under 35 U.S.C. 154(b) by 1117 days.

(21) Appl. No.: 16/504,057

(22) Filed: Jul. 5, 2019

(65) Prior Publication Data

US 2021/0001980 A1    Jan. 7, 2021

(51) Int. Cl.
*B64C 29/00* (2006.01)
*F16F 7/108* (2006.01)
*F16F 7/10* (2006.01)
*B64C 7/00* (2006.01)
*B64C 27/00* (2006.01)

(52) U.S. Cl.
CPC ............ *B64C 29/0091* (2013.01); *B64C 7/00* (2013.01); *B64C 27/001* (2013.01); *B64C 29/0033* (2013.01); *F16F 7/108* (2013.01); *F16F 7/1034* (2013.01); *F16F 2222/08* (2013.01)

(58) Field of Classification Search
CPC .......... F16F 7/104; F16F 7/108; F16F 7/1034; F16F 2222/08; B64C 27/001; B64C 2027/002; B64C 29/0033; B64C 7/00
See application file for complete search history.

(56) References Cited

U.S. PATENT DOCUMENTS

| | | | |
|---|---|---|---|
| 3,467,451 A | 9/1969 | Marley | |
| 4,811,919 A * | 3/1989 | Jones | F16F 13/08 244/54 |
| 4,848,495 A * | 7/1989 | Hayashi | G01G 21/10 177/187 |
| 6,045,328 A * | 4/2000 | Jones | F16F 13/105 267/141.1 |
| 8,328,129 B2 * | 12/2012 | Smith | F16F 7/10 244/17.11 |
| 9,126,678 B2 | 9/2015 | Ross et al. | |
| 9,868,541 B2 * | 1/2018 | Kooiman | B64D 27/26 |
| 9,981,750 B2 | 5/2018 | Williams et al. | |
| 10,029,802 B2 | 7/2018 | Williams et al. | |
| 2018/0051765 A1 * | 2/2018 | Seifert | B64D 35/00 |

* cited by examiner

*Primary Examiner* — Nicholas McFall
*Assistant Examiner* — Marisa V Conlon
(74) *Attorney, Agent, or Firm* — Edwin S. Flores; Daniel J. Chalker; Chalker Flores, LLP

(57) ABSTRACT

A vibratory motion reduction system for a pylon assembly includes an inner member having an opening extending therein that receives a first end of the pylon assembly, an outer member moveably attached to the inner member, a tuning mass attached to the inner member and the outer member such that a vibratory motion of the pylon assembly accelerates the tuning mass, a spring member that couples to a second end of the pylon assembly, and the spring member and the tuning mass reduce the vibratory motion of the pylon assembly.

13 Claims, 15 Drawing Sheets

SYSTEM AND METHOD FOR VIBRATORY MOTION REDUCTION FOR A PYLON ASSEMBLY

CROSS-REFERENCE TO RELATED APPLICATIONS

Not applicable.

STATEMENT OF FEDERALLY FUNDED RESEARCH

This application is not the subject of any federally sponsored research or development.

TECHNICAL FIELD OF THE INVENTION

The present invention relates in general to the field of vibration control, and more particularly, to a system and method for vibratory motion reduction for a pylon assembly.

BACKGROUND OF THE INVENTION

Without limiting the scope of the invention, its background is described in connection with vibration isolation devices for aircraft.

In tiltrotor aircraft, the oscillatory loads created by the proprotor blades are transmitted through the mast into the spindle gearbox of proprotor gearbox, which causes vibratory motion of the pylon assembly. This vibratory motion causes increased wear on the aircraft components. Moreover, the crew and passengers can feel this vibratory motion, which makes the flight less comfortable.

As a result, there is a need to reduce this vibratory motion.

SUMMARY OF THE INVENTION

In one embodiment, a vibratory motion reduction system for a pylon assembly includes: an inner member having an opening extending therein to receive a first end of the pylon assembly; an outer member moveably attached to the inner member; a tuning mass attached to the inner member and the outer member such that a vibratory motion of the pylon assembly accelerates the tuning mass; a spring member that couples to a second end of the pylon assembly; and the spring member and the tuning mass reduce the vibratory motion of the pylon assembly.

In one aspect, the spring member comprises an outboard pedestal or a portion of the outboard pedestal having a stiffness represented by a spring constant. In another aspect, a flexible member attached between the inner member and the outer member. In another aspect, the flexible member comprises an elastomer layer, a journal bearing, or a plurality of resilient elements. In another aspect, the tuning mass comprises a mechanical system, a hydraulic system or combination thereof. In another aspect, the tuning mass comprises: a first chamber disposed adjacent to a first side of the inner member; a second chamber disposed adjacent to a second side of the inner member; a tuning port connecting the first chamber to the second chamber; a tuning fluid disposed within the first chamber and the second chamber; and the vibratory motion of the pylon assembly causes the inner member to compress at least a portion of the first chamber while simultaneously decompressing at least a portion of the second chamber, or compress at least the portion of the second chamber while simultaneously decompressing at least the portion of the first chamber. In another aspect, the tuning port extends through the inner member or the outer member. In another aspect, the tuning port is disposed within a housing or external to the housing. In another aspect, the first chamber is further disposed adjacent to a first side of the outer member; and the second chamber is further disposed adjacent to a second side of the outer member. In another aspect, the inner member comprises a first bearing assembly or the outer member comprises a second bearing assembly. In another aspect, a housing has a opening extending therein that does to not interfere with the vibratory motion of the pylon assembly, wherein the housing is attached to the outer member, encloses the tuning mass, and partially encloses the inner member. In another aspect, the housing is configured to replace a circular bearing assembly. In another aspect, the housing is configured to be mounted on a base, within a pedestal or as a cartridge. In another aspect, the outer member comprises a housing having an opening extending therein that does to not interfere with the vibratory motion of the pylon assembly, and the housing encloses the tuning mass, and partially encloses the inner member.

In another embodiment, a pedestal assembly for receiving a pylon assembly of a tiltrotor aircraft having a helicopter mode and an airplane mode is disclosed wherein the tiltrotor aircraft having an airframe including a fuselage and a wing. The pedestal assembly comprises: an inboard pedestal supported by the airframe and positioned above the wing or adjacent to the wing, the inboard pedestal including an inboard bearing assembly; an outboard pedestal supported by the airframe and positioned above the wing or adjacent to the wing, the outboard pedestal including an outboard bearing assembly; the inboard and outboard bearing assemblies are operable to receive the pylon assembly therein such that the pylon assembly is rotatably mounted between the inboard and outboard pedestals along a rotational axis to selectively operate the tiltrotor aircraft between the helicopter mode and the airplane mode; a tuning mass coupled to the inboard pedestal and the pylon assembly; the outboard pedestal or a portion of the outboard pedestal has a stiffness represented by a spring constant; and the tuning mass and stiffness of the outboard pedestal or the portion of the outboard pedestal reduce the vibratory motion of the pylon assembly.

In one aspect, the tuning mass comprises a mechanical system, a hydraulic system or combination thereof. In another aspect, the inboard bearing assembly comprises: an inner member having an opening extending therein that receives the pylon assembly; an outer member moveably attached to the inner member; the tuning mass attached to the inner member and the outer member such that the vibratory motion of the pylon assembly accelerates the tuning mass; and the inner member comprises a first bearing assembly or the outer member comprises a second bearing assembly. In another aspect, a flexible member is attached between the inner member and the outer member. In another aspect, the flexible member comprises an elastomer layer, a journal bearing or a plurality of resilient elements. In another aspect, the tuning mass comprises: a first chamber disposed adjacent to a first side of the inner member; a second chamber disposed adjacent to a second side of the inner member; a tuning port connecting the first chamber to the second chamber; a tuning fluid disposed within the first chamber and the second chamber; and the vibratory motion of the pylon assembly causes the inner member to compress at least a portion of the first chamber while simultaneously decompressing at least a portion of the second chamber, or compress at least the portion of the second chamber while simultaneously decompressing at least the portion of the first chamber. In another aspect, the tuning port extends through the inner member or the outer member. In another aspect, the tuning port is disposed within a housing or external to the housing. In another aspect, the first chamber is further disposed adjacent to a first side of the outer member; and the second chamber is further disposed adjacent to a second side of the outer member. In another aspect, a housing has a opening extending therein that does to not interfere with the vibratory motion of the pylon assembly, wherein the housing is attached to the outer member, encloses the tuning mass, and partially encloses the inner member. In another aspect, the outer member comprises a housing having an opening extending therein that does to not interfere with the vibratory motion of the pylon assembly, and the housing encloses the tuning mass, and partially encloses the inner member.

In another embodiment, a method of reducing a vibratory motion of a pylon assembly of a tiltrotor aircraft having a helicopter mode and an airplane mode in which the tiltrotor aircraft has an airframe including a fuselage and a wing is disclosed. An inboard pedestal supported by the airframe and positioned above the wing or adjacent to the wing is provided, wherein the inboard pedestal including an inboard bearing assembly. An outboard pedestal supported by the airframe and positioned above the wing or adjacent to the wing is provided, wherein the outboard pedestal includes an outboard bearing assembly, and the outboard pedestal or a portion of the outboard pedestal has a stiffness represented by a spring constant. The pylon assembly operably mounted in the inboard and outboard bearing assemblies is provided such that the pylon assembly is rotatably mounted between the inboard and outboard pedestals along a rotational axis to selectively operate the tiltrotor aircraft between the helicopter mode and the airplane mode. A tuning mass coupled to the inboard pedestal and the pylon assembly is provided. The vibratory motion the pylon assembly is reduced using the tuning mass and the stiffness of the outboard pedestal or the portion of the outboard pedestal.

In one aspect, the method further comprises configuring the tuning mass and the stiffness of the outboard pedestal or the portion of the outboard pedestal to reduce the vibratory motion of the pylon assembly. In another aspect, the method further comprises: determining the spring constant; and adjusting the tuning mass to reduce the vibratory motion the pylon assembly based on the spring constant. In another aspect, the tuning mass comprises a mechanical system, a hydraulic system or combination thereof. In another aspect, the inboard bearing assembly comprises: an inner member having an opening extending therein that receives the pylon assembly; an outer member moveably attached to the inner member; the tuning mass attached to the inner member and the outer member such that the vibratory motion of the pylon assembly accelerates the tuning mass; and the inner member comprises a first bearing assembly or the outer member comprises a second bearing assembly. In another aspect, a flexible member is attached between the inner member and the outer member. In another aspect, the flexible member comprises an elastomer layer, a journal bearing or a plurality of resilient elements. In another aspect, the tuning mass comprises: a first chamber disposed adjacent to a first side of the inner member; a second chamber disposed adjacent to a second side of the inner member; a tuning port connecting the first chamber to the second chamber; a tuning fluid disposed within the first chamber and the second chamber; and the vibratory motion of the pylon assembly causes the inner member to compress at least a portion of the first chamber while simultaneously decompressing at least a portion of the second chamber, or compress at least the portion of the second chamber while simultaneously decompressing at least the portion of the first chamber. In another aspect, the tuning port extends through the inner member or the outer member. In another aspect, the tuning port is disposed within a housing or external to the housing. In another aspect, the first chamber is further disposed adjacent to a first side of the outer member; and the second chamber is further disposed adjacent to a second side of the outer member. In another aspect, a housing has a opening extending therein that does to not interfere with the vibratory motion of the pylon assembly, wherein the housing is attached to the outer member, encloses the tuning mass, and partially encloses the inner member. In another aspect, the outer member comprises a housing having an opening extending therein that does to not interfere with the vibratory motion of the pylon assembly, and the housing encloses the tuning mass, and partially encloses the inner member.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices and systems are depicted in the attached drawings. However, as will be recognized by those skilled in the art after a complete reading of the present application, the devices, systems, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices and systems described herein may be oriented in any desired direction.

Figure 1A:
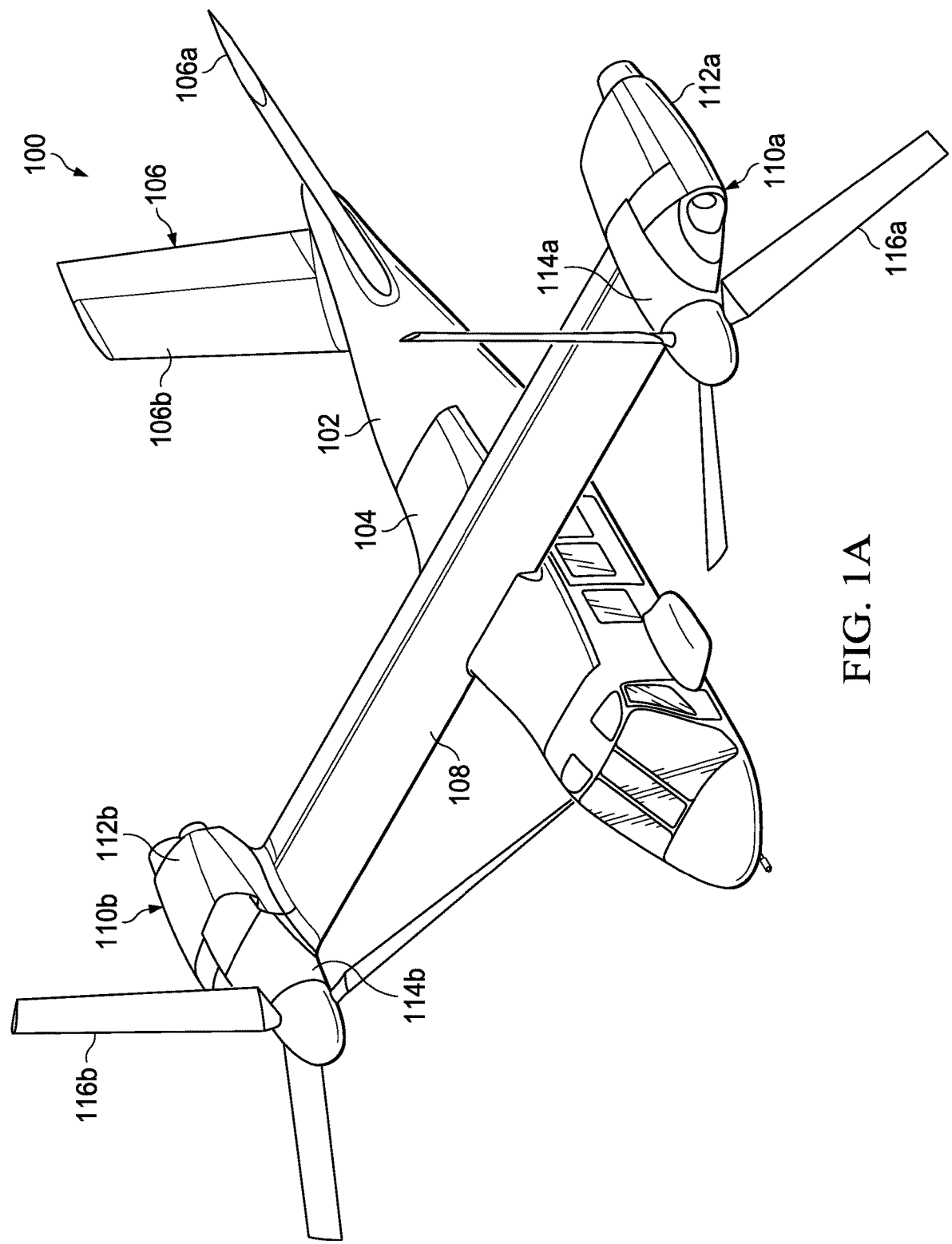
FIG. 1A is a perspective view of a tiltrotor aircraft in airplane mode in accordance with various embodiments of the present invention.
Figure 1B:
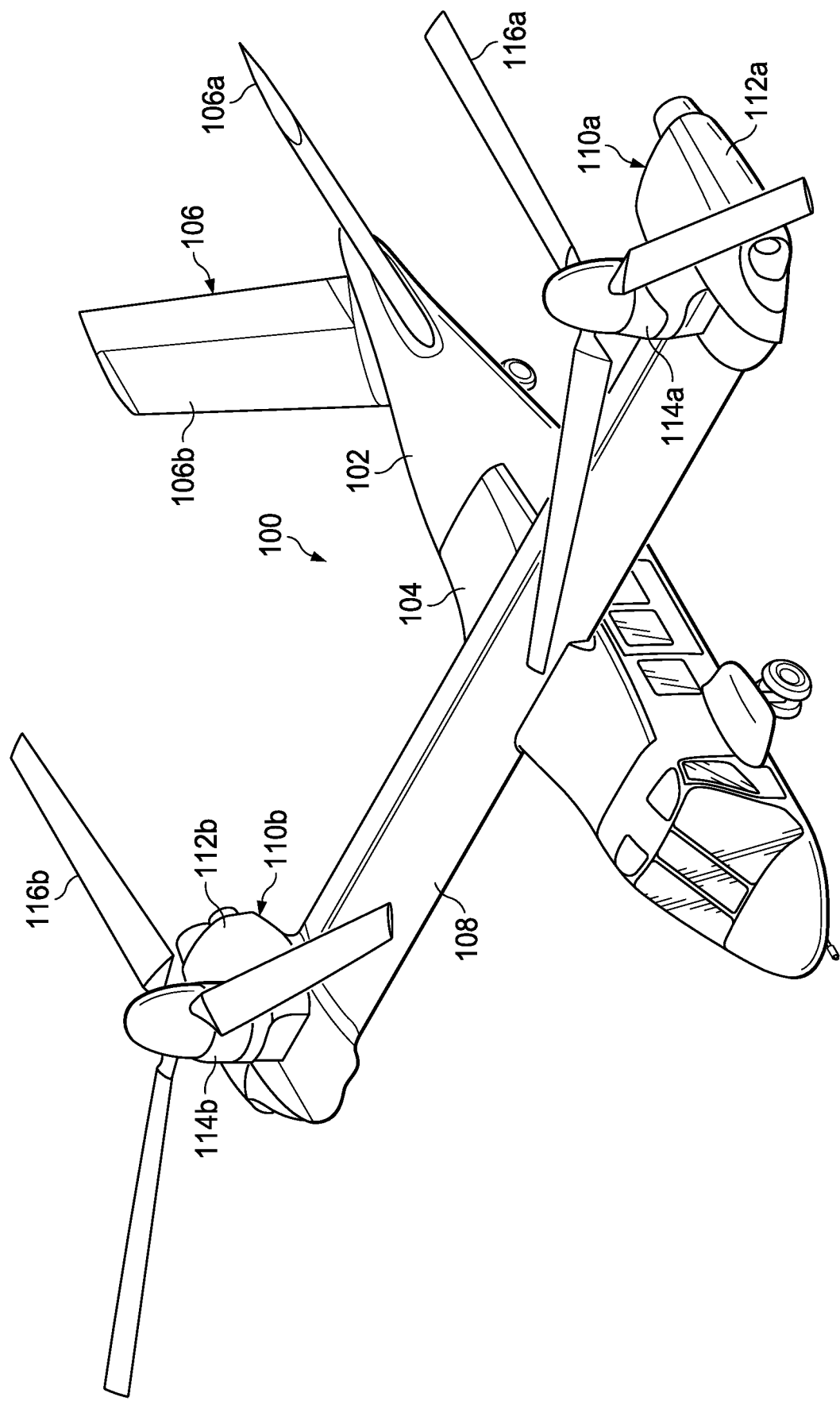
FIG. 1B is a perspective view of a tiltrotor aircraft in helicopter mode in accordance with various embodiments of the present invention.

Now referring to FIGS. 1A-1B, a tiltrotor aircraft 100 in airplane or forward flight mode, and helicopter or VTOL flight mode, respectively, are shown. Aircraft 100 includes a fuselage 102, a wing mount assembly 104 that is rotatable relative to fuselage 102 and a tail assembly 106 including rotatably mounted tail members 106a, 106b having control surfaces operable for horizontal and/or vertical stabilization during forward flight. A wing 108 is supported by wing mount assembly 104 and rotates with wing mount assembly 104 relative to fuselage 102 to enable tiltrotor aircraft 100 to convert to a storage configuration. Together, fuselage 102, tail assembly 106 and wing 108 as well as their various frames, longerons, stringers, bulkheads, spars, ribs, skins and the like may be considered to be the airframe of tiltrotor aircraft 100.

Propulsion assemblies 110a, 110b are located proximate the outboard ends of wing 108 and include a fixed nacelle 112a that houses an engine and a fixed portion of the drive system. In addition, propulsion assembly 110a includes a pylon assembly 114a that is positioned inboard of fixed nacelle 112a and above wing 108. Pylon assembly 114a is rotatable relative to fixed nacelle 112a and wing 108 between a generally horizontal orientation (FIG. 1A) and a generally vertical orientation (FIG. 1). Pylon assembly 114a includes a rotatable portion of the drive system and a proprotor assembly 116a that is rotatable responsive to torque and rotational energy provided via the engine and drive system. Likewise, propulsion assembly 110b includes a fixed nacelle 112b that houses an engine and a fixed portion of the drive system. In addition, propulsion assembly 110b includes a pylon assembly 114b that is positioned inboard of fixed nacelle 112b and above wing 108. Pylon assembly 114b is rotatable relative to fixed nacelle 112b and wing 108 between a generally horizontal orientation (FIG. 1A), and a generally vertical orientation (FIG. 1B). Pylon assembly 114b includes a rotatable portion of the drive system and a proprotor assembly 116b that is rotatable responsive to torque and rotational energy provided via the engine and drive system.

FIG. 1A illustrates aircraft 100 in airplane or forward flight mode, in which proprotor assemblies 116a, 116b are rotating in a substantially vertical plane to provide a forward thrust enabling wing 108 to provide a lifting force responsive to forward airspeed, such that aircraft 100 flies much like a conventional propeller driven aircraft. FIG. 1B illustrates aircraft 100 in helicopter or VTOL flight mode, in which proprotor assemblies 116a, 116b are rotating in a substantially horizontal plane to provide a lifting thrust, such that aircraft 100 flies much like a conventional helicopter. It should be appreciated that aircraft 100 can be operated such that proprotor assemblies 116a, 116b are selectively positioned between airplane mode and helicopter mode, which can be referred to as a conversion flight mode. Even though aircraft 100 has been described as having one engine in each fixed nacelle 112a, 112b, it should be understood by those having ordinary skill in the art that other propulsion system arrangements are possible and are considered to be within the scope of the present disclosure including, for example, having one or more engines housed within one of the fixed nacelles or within the fuselage that provide torque and rotational energy to both proprotor assemblies 116a, 116b.

During all flight modes, proprotor assemblies 116a, 116b rotate in opposite directions to provide torque balancing to aircraft 100. For example, when viewed from the front of aircraft 100 in forward flight mode, proprotor assembly 116a rotates clockwise and proprotor assembly 116b rotates counterclockwise. In the illustrated embodiment, proprotor assemblies 116a, 116b each include three twisted proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. Further, it should be understood by those having ordinary skill in the art that even though propulsion assemblies 110a, 110b are illustrated in the context of tiltrotor aircraft 100, the propulsion systems of the present disclosure can be implemented on other types of tiltrotor aircraft including, for example, quad tiltrotor aircraft and unmanned tiltrotor aircraft, to name a few.

Referring now to FIGS. 2-5, propulsion assembly 110a is disclosed in further detail. Propulsion assembly 110a is substantially similar to propulsion assembly 110b therefore, for sake of efficiency, certain features will be disclosed only with regard to propulsion assembly 110a. One having ordinary skill in the art, however, will fully appreciate an understanding of propulsion assembly 110b based upon the disclosure herein of propulsion assembly 110a. Propulsion assemblies 110a, 110b include an engine 200 that is fixed relative to wing 108. An engine output shaft 202 transfers power from engine 200 to a spiral bevel gearbox 204 that includes spiral bevel gears to change torque direction by 90 degrees from engine 200 to a fixed gearbox 206. Fixed gearbox 206 includes a plurality of gears, such as helical gears, in a gear train that are coupled to an interconnect drive shaft 208 and a common shaft such as quill shaft. Torque is transferred to the spindle gearbox 210 of proprotor gearbox 212 through the quill shaft.

Interconnect drive shaft 208 provides a torque path that enables a single engine to provide torque to both proprotors assemblies 116a, 116b in the event of a failure of the other engine. In the illustrated embodiment, interconnect drive shaft 208 has a rotational axis 214 that is vertically lower and horizontally aft of a longitudinal axis of the spindle gearbox 210 referred to herein as the rotational axis 216

(also referred to as a conversion axis) of the pylon assembly 114a. The rotational axis 216 of the pylon assembly 114a is parallel to a lengthwise axis 218 of wing 108.

Figure 2:
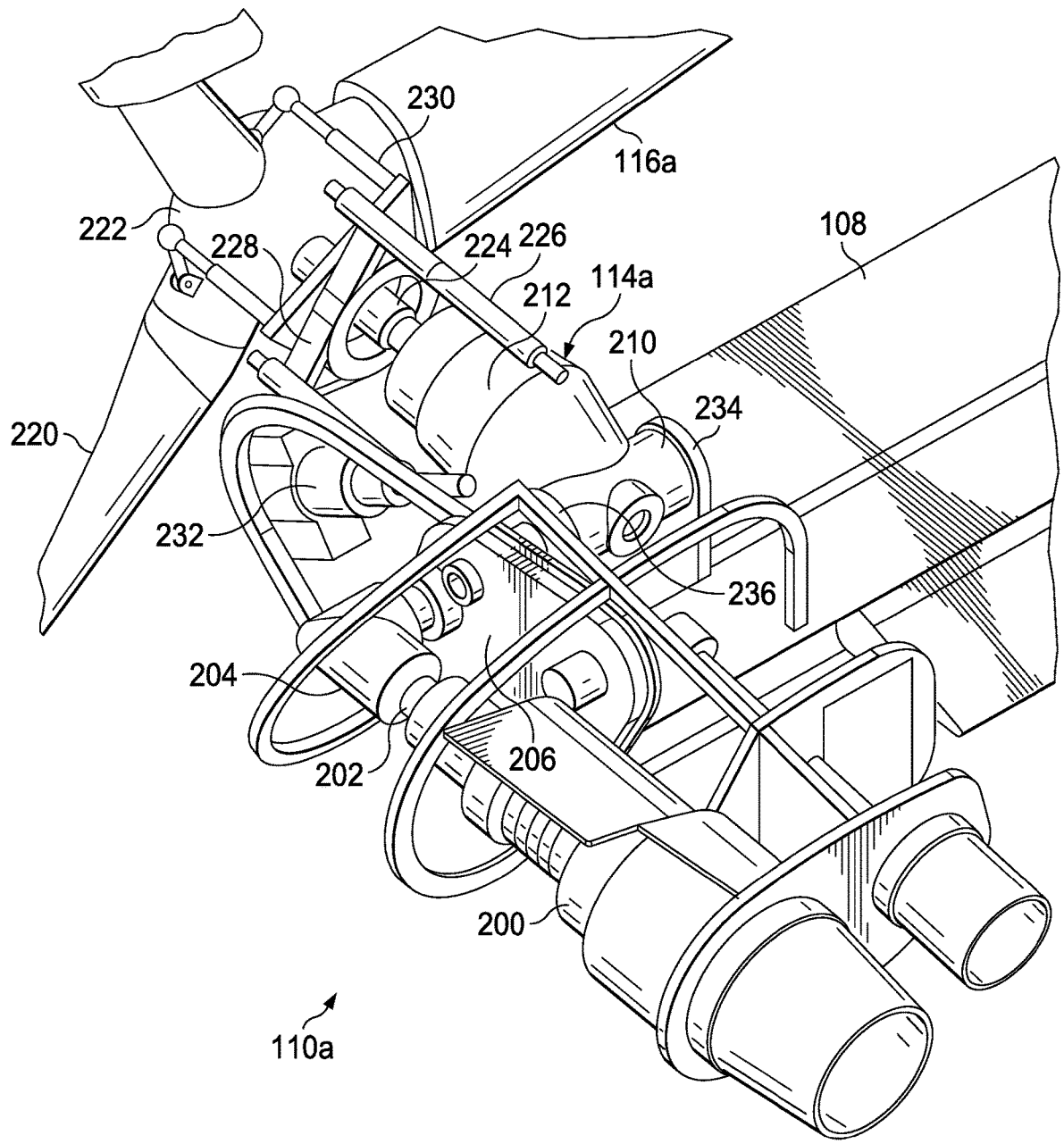
FIG. 2 is a perspective view of a propulsion system of a tiltrotor aircraft in accordance with various embodiments of the present invention.
Figure 3:
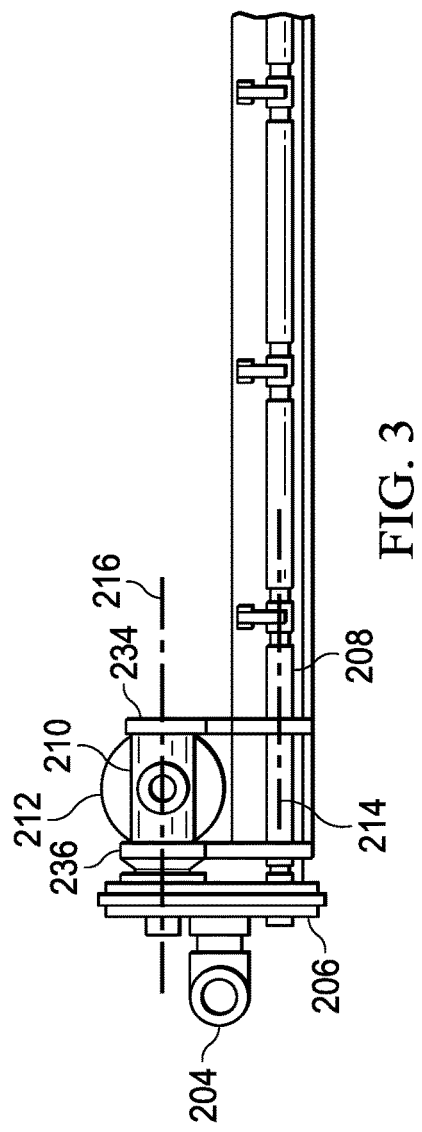
FIG. 3 is an aft view of a propulsion system and wing section of a tiltrotor aircraft in accordance with various embodiments of the present invention.
Figure 4:
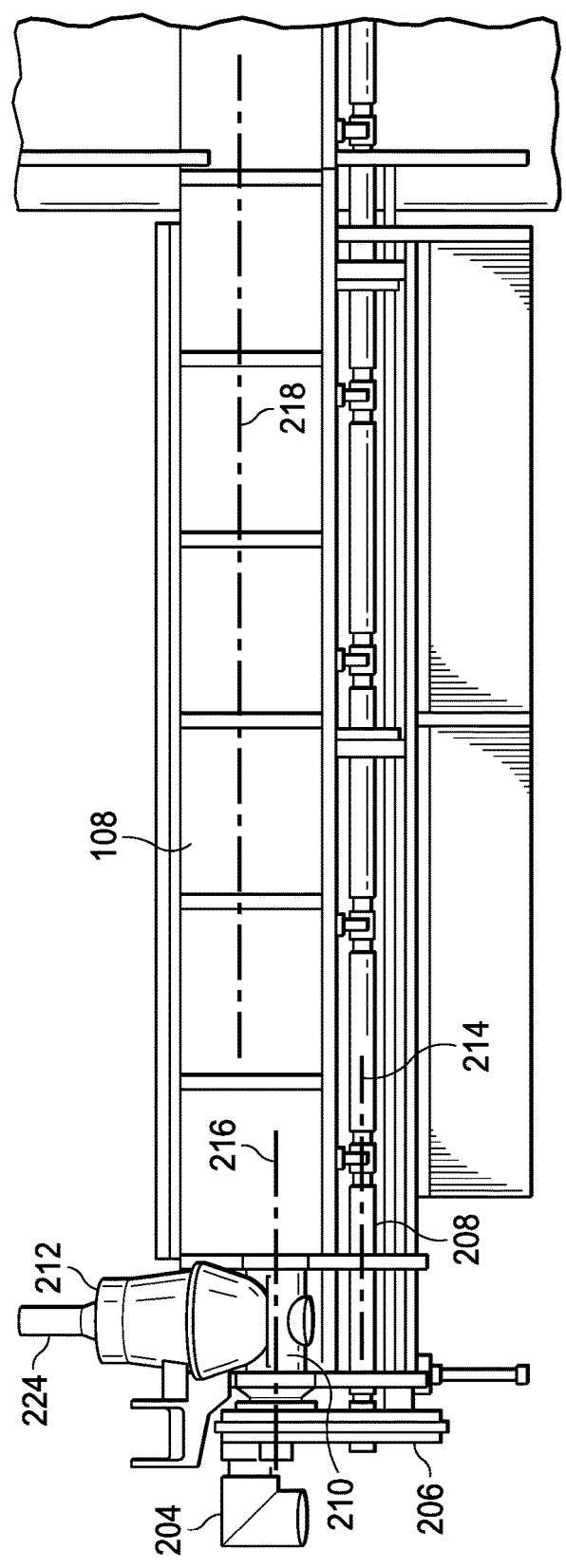
FIG. 4 is a top view of a propulsion system and wing section of a tiltrotor aircraft in accordance with various embodiments of the present invention.

As best seen in FIG. 2, proprotor assembly 116a of propulsion system 110a includes a plurality of proprotor blades 220 coupled to a yoke 222 that is coupled to a mast 224. Mast 224 is coupled to proprotor gearbox 212. The collective and/or cyclic pitch of proprotor blades 220 may be controlled responsive to pilot input via actuators 226, swashplate 228 and pitch links 230. Spindle gearbox 210 is rotatably coupled to the airframe of tiltrotor aircraft 100 by mounting spindle gearbox 210 to an inboard pedestal 234 and an outboard pedestal 236. The inboard pedestal 234 is supported by the airframe and positioned above the wing 108 (FIGS. 2-6) or adjacent to the wing 108 (see FIGS. 11A-11D). Likewise, the outboard pedestal 236 is supported by the airframe and positioned above the wing 108 (FIGS. 2-6) or adjacent to the wing 108 (see FIGS. 11A-11D). Thus, spindle gearbox 210 is structurally supported and is operable to be rotated about the rotational axis 216 of the pylon assembly 114a by conversion actuator 232. During operation, a conversion actuator 232, can be actuated so as to selectively rotate proprotor gearbox 212 and thus pylon assembly 114a about the rotational axis 216 of the pylon assembly 114a, which in turn selectively positions proprotor assembly 116a between helicopter mode (FIG. 1B) and airplane mode (FIG. 1A).

Figure 5:
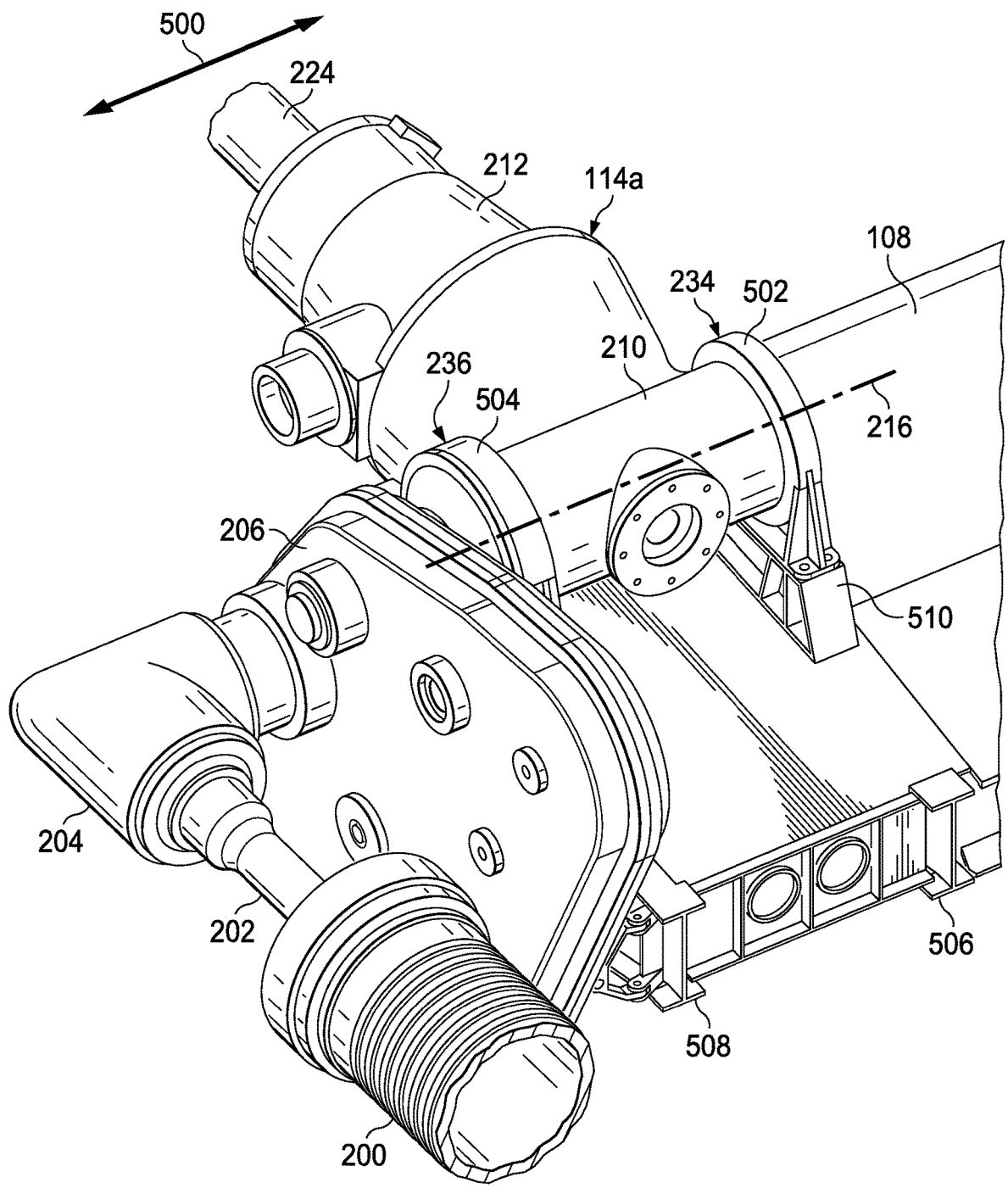
FIG. 5 is a perspective view of a wing section of a tiltrotor aircraft in accordance with various embodiments of the present invention.
Figure 6:
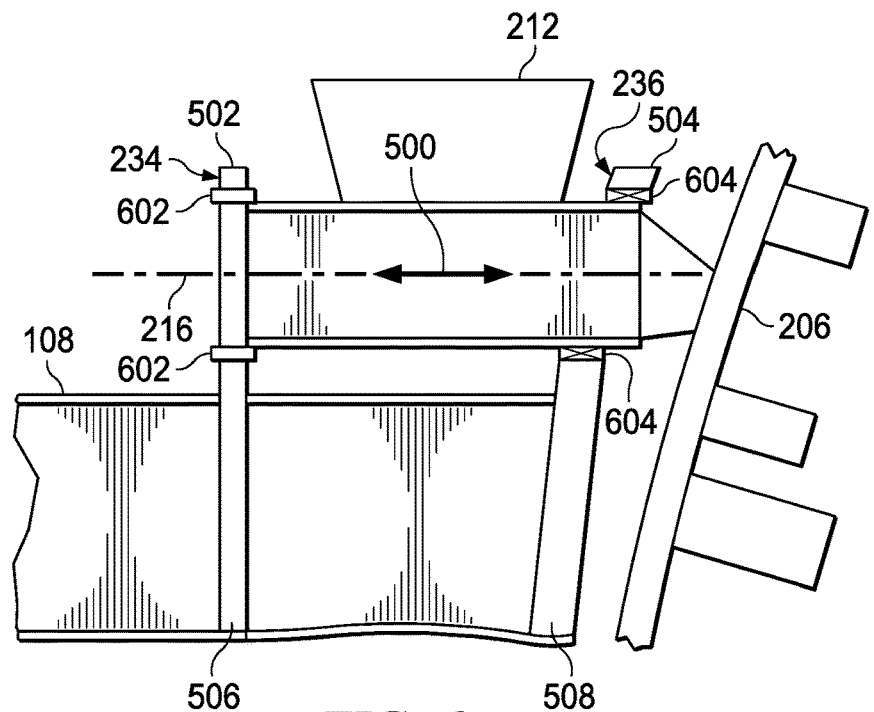
FIG. 6 is an exaggerated diagram illustrating the vibratory motion of the pylon assembly in accordance with various embodiments of the present invention.

Now referring to FIGS. 5-6, inboard pedestal 234 includes an inboard pillow block housing 502 having an inboard bearing assembly 602, and outboard pedestal 236 includes an outboard pillow block housing 504 having an outboard bearing assembly 604. Inboard pillow block housing 502 is structurally coupled to an inboard tip rib 506. Similarly, outboard pillow block housing 504 is structurally coupled to an outboard tip rib 508. Inboard tip rib 506 and outboard tip rib 508 are structural members of the airframe of tiltrotor aircraft 100. As shown in FIG. 5, the inboard pedestal 234 includes an inboard intermediate support 510 that is utilized as a structural element between inboard pillow block 502 and inboard tip rib 506. Likewise, the outboard pedestal 236 includes an outboard intermediate support (not visible) that is utilized as a structural element between outboard pillow block housing 504 and outboard tip rib 508. It should be appreciated that the exact structural configuration is implementation specific, and the structural components can be combined and/or separated to meet implementation specific requirements. For example in FIG. 6, airframe structures, such as tip ribs 506 and 508, extend above wing 108 and form a portion of the inboard and outboard pedestals 234, 236.

The oscillatory loads created by the proprotor blades 220 are transmitted through mast 224 into spindle gearbox 210 of proprotor gearbox 212, which causes vibratory motion 500 of the pylon assembly 114a generally along the rotational axis 216 of the pylon assembly 114a. As a result, the inboard pedestal 234 includes an inboard bearing assembly 602 and a tuning mass coupling the inboard pedestal 234 to the pylon assembly 114a (see FIGS. 8-10C) disposed within the inboard pillow block housing 502. The outboard pedestal 236 includes an outboard bearing assembly 604 disposed within the outboard pillow block housing 504. The outboard pedestal 236 or a portion of the outboard pedestal has a stiffness represented by a spring constant ($K_{TipRib}$). Due to the design of the tuning mass and associated coupling components (see FIGS. 8-10C), the inboard tip rib 506 does not substantially support or react to the vibratory motion 500 of the proprotor gearbox 212. The outboard tip rib 508 supports and reacts to the vibratory motion 500 of the proprotor gearbox 212. FIG. 6 is an exaggerated depiction of the vibratory motion 500 of the pylon assembly 114a. The large mass of the proprotor gearbox 212 and accessory gearbox 206 combined with the inherent flexibility of the outboard tip rib 508 creates the vibratory motion 500.

Figure 7:
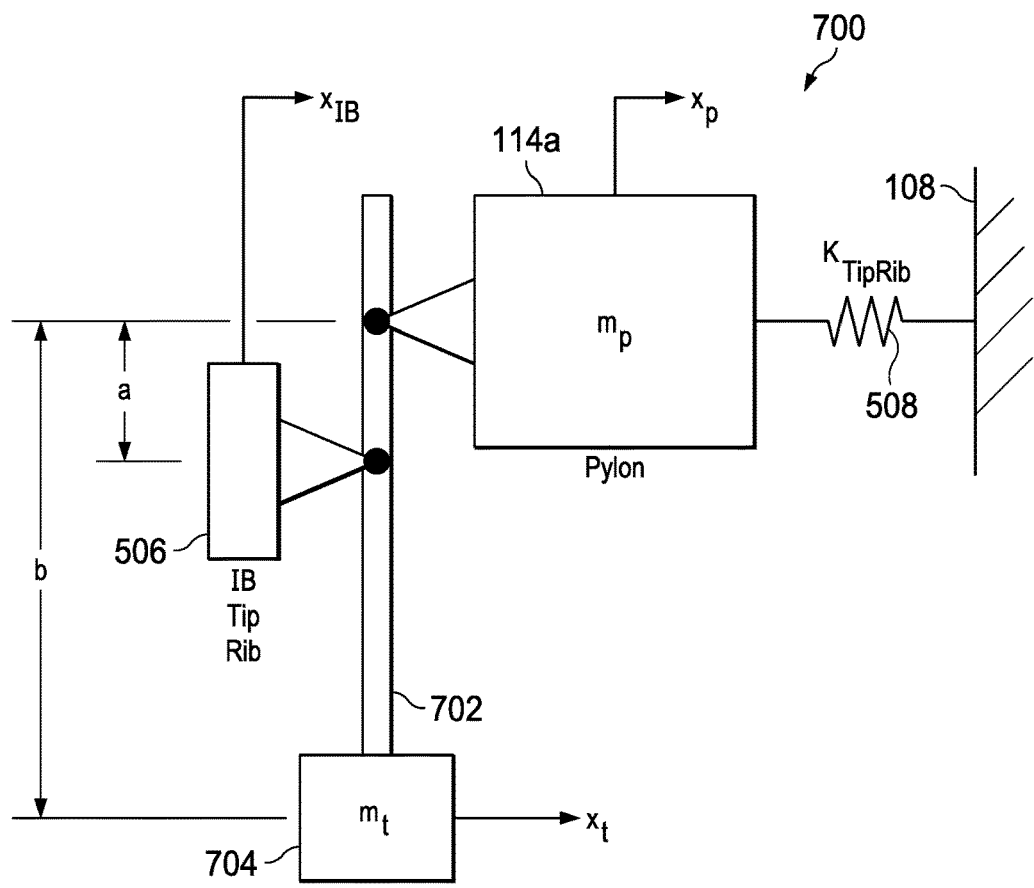
FIG. 7 illustrates a mechanical equivalent model for the vibratory motion reduction system in accordance with one embodiment of the present invention.

Now referring to FIG. 7, a mechanical equivalent model 700 for the vibratory motion reduction system in accordance with one embodiment of the present invention is shown. The stiffness of the outboard tip rib 508 is represented by the spring constant ($K_{TipRib}$) between the pylon assembly 114a having a mass ($m_p$) and the support structure of the wing 108. The outboard tip rib 508 or a portion thereof can be designed or modified to provide a desired spring constant ($K_{TipRib}$). In other words, the inherent flexibility of the outboard tip rib 508 can be tailored to produce the desired vibratory motion reduction in combination with tuning mass 704 while maintaining the hard mounting between the pylon assembly 114a and the support structure of the wing 108. The motion of the pylon assembly 114a is represented by $x_p$. If the stiffness of the outboard tip rib 508 is too high, the relative motion on the inboard side between the proprotor gearbox and the inboard tip rib will be too low to move the tuning mass and attenuate the vibratory motion. The motion of the inboard tip rib 506 is represented by $x_{IB}$. The vibratory motion reduction system includes a lever arm equivalent 702, a tuning mass 704 having a mass ($m_t$) and a motion ($x_t$), and the stiffness of the outboard tip rib 508. The relative motion between the pylon assembly 114a and the inboard tip rib 506 can be leveraged to accelerate the tuning mass 704. The distance between the connection points of the lever arm equivalent 702 to the inboard tip rib 506 and pylon assembly 114a is represented by a. The distance between the connection points of the lever arm equivalent 702 to the tuning mass 704 and pylon assembly 114a is represented by b. The hydraulic ratio R is equal to the ratio of b to a.

Figure 8:
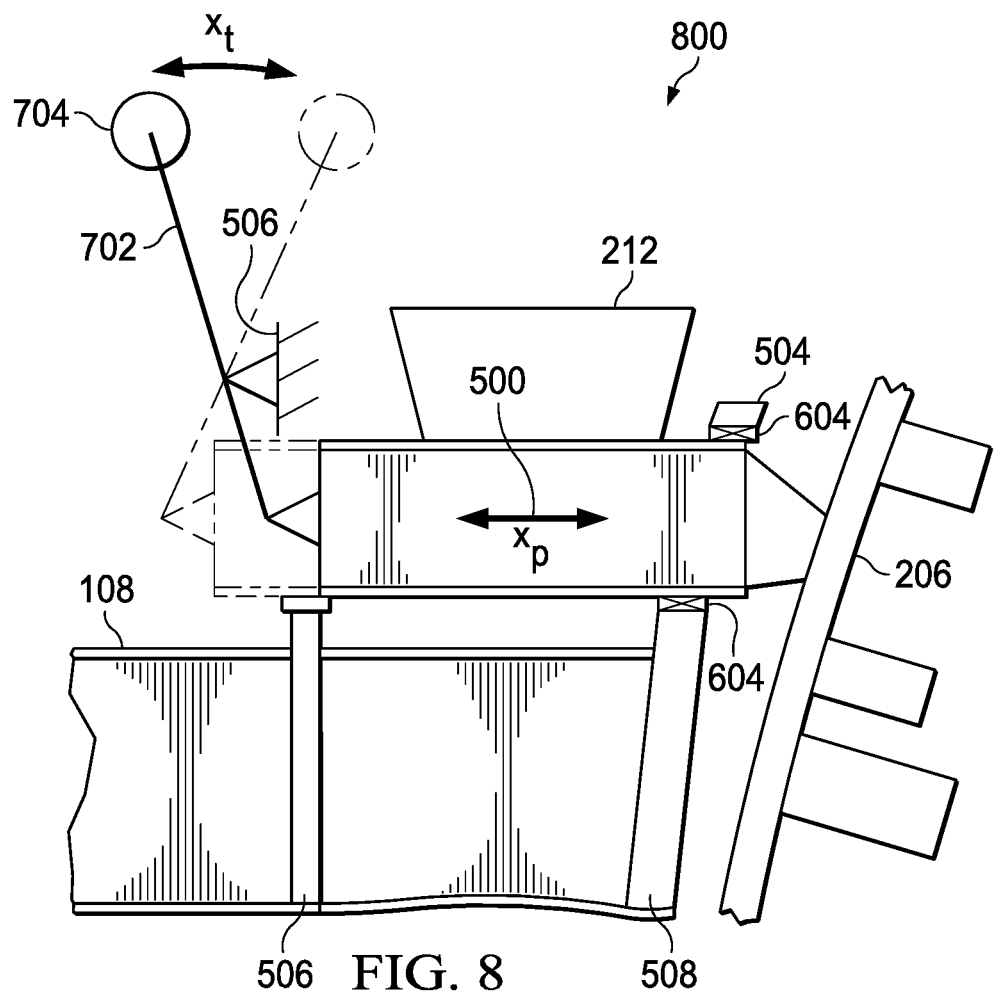
FIG. 8 is a functional representation of a mechanical vibratory motion reduction system in accordance with one embodiment of the present invention.

Referring now to FIG. 8, a functional representation of a mechanical vibratory motion reduction system 800 in accordance with one embodiment of the present invention is shown. The outboard bearing assembly 604 is fixed axially so that the outboard pillow block housing 504 and outboard tip rib 508 move in unison. The vibratory motion reduction system 800 dynamically tunes pylon modes to suppress or reduce the vibratory motion of the pylon assembly 114a (proprotor gearbox 212). The tuning mass 704 is accelerated back-and-forth via mechanical lever arm 702 leveraging the relative motion between the pylon assembly 114a (proprotor gearbox 212) and the inboard tip rib 506. The acceleration of the tuning mass 704 provides a way to tune the pylon modes relative to the forcing frequencies and thereby cancel or reduce the vibratory motion 500. Note that FIG. 8 is not necessarily to scale and the relative size and position of the components may vary.

Now referring to FIGS. 9A-9D, a hydraulic vibratory motion reduction system 900 in accordance with several embodiments of the present invention is shown. The vibratory motion reduction system 900 includes an inner member 902, an outer member 906, a flexible member 904 (optional) attached between the inner member 902 and the outer member 906, a tuning mass 908 attached to the inner member 902 and the outer member 906 such that a vibratory motion 500 of the pylon assembly 114a accelerates the tuning mass 908, and a spring member (not shown). The inner member 902 has an opening 910 extending therein to receive a first end of a pylon assembly 114a having a rotational axis 216. The inner member 902 can be a first bearing assembly, or the outer member 906 can be a second bearing assembly, or both the inner member 902 and outer member 906 can be bearing assemblies. The flexible member 904 provides a non-linear resiliency to the vibratory motion 500 of the pylon assembly 114a and substantially restricts a radial movement 912 of the pylon assembly 114a. The flexible member 904 can be an elastomer layer, a journal bearing or a plurality of resilient elements. As illustrated in FIGS. 10A-10C, the tuning mass 908 moves in response to the vibratory motion 500 of the pylon assembly 114a. The spring member (not shown) is typically the outboard pedestal or a portion of the outboard pedestal having a stiffness represented by a spring constant. The spring member (not shown) and the tuning mass 908 reduce the vibratory motion 500 of the pylon assembly 114a when the outer member is attached to a support structure, such as inboard pedestal 234 (FIG. 2), for the pylon assembly 114a. Note that FIGS. 9A-9D are not necessarily to scale and the relative size and position of the components may vary. As shown, the inner member 902, flexible member 904 and the inner member 902 are generally circular in shape such that they are circumferentially attached to one another. The present invention is not limited to the shapes shown in the figures. As a result, these components can be any shape suitable for the particular design of the aircraft.

As previously described, the tuning mass 908 can be a mechanical system, a hydraulic system or combination thereof. As shown, tuning mass 908 is a hydraulic system that includes a first chamber 914 disposed adjacent to a first side 916 of the inner member 902, a second chamber 918 disposed adjacent to a second side 920 of the inner member 902, a tuning port 922 connecting the first chamber 914 to the second chamber 918, and a tuning fluid 934 disposed within the first chamber 914 and the second chamber 918. As shown, the first chamber 914 and second chamber 918 are generally cylindrical in shape. Other shapes can be used. As a result, the first chamber 914 can be adjacent to: the first side 916 of the inner member 902; or the first side 916 of the inner member 902 and a first side 924 of the spring member 904; or the first side 916 of the inner member 902, the first side 924 of the spring member 904 and a first side 926 of the outer member 906. Likewise, the second chamber 918 can be adjacent to: the second side 920 of the inner member 902; the second side 920 of the inner member 902 and a second side 928 of the spring member 904; or the second side 920 of the inner member 902, the second side 928 of the spring member 904 and a second side 930 of the outer member 906. The first and second chamber 914, 918 will typically have a rigid exterior wall 932, which can be part of an external housing 950 (FIGS. 9B-9D), and a flexible interior wall so that the tuning fluid 934 is pumped back-and-forth between the first and second chambers 914, 918 (represented by arrow 936) in response to the vibratory motion 500 of the pylon assembly 114a (see e.g., FIGS. 10A-10C). In some embodiments, the necessary flexibility can be supplied by using a bladder (not shown) within the chambers 914, 918.

Note that the shape and location of the tuning port 922 is exaggerated to illustrate its function. Accordingly, the tuning port 922 can extend through the inner member 902 (FIG. 9B), the outer member 906 (FIG. 9C), or be disposed within housing 950 (FIG. 9D) or external to the housing 950, or any combination thereof. Moreover, the tuning port 922 can have a variable diameter. Furthermore and in some embodiments, the tuning port 922 will be multiple ports spaced around the first and second cylindrical chambers 914, 918. Tuning fluid 934 preferably has low viscosity, relatively high density, and non-corrosive properties. In some embodiments, a reservoir (not shown) in fluid communication with the first chamber 914 and/or the second chamber 918 can provide pressurized control of the vibratory motion reduction system 900. As will be appreciated by those skilled in the art, other components or features can be added to the vibratory motion reduction system 900 to dynamically change or adjust the operating parameters of the tuning mass 908. As will be appreciated by those skilled in the art, other configurations for the tuning mass 908 can be used, and the present invention is not limited to one the embodiment shown.

Figure 9A:
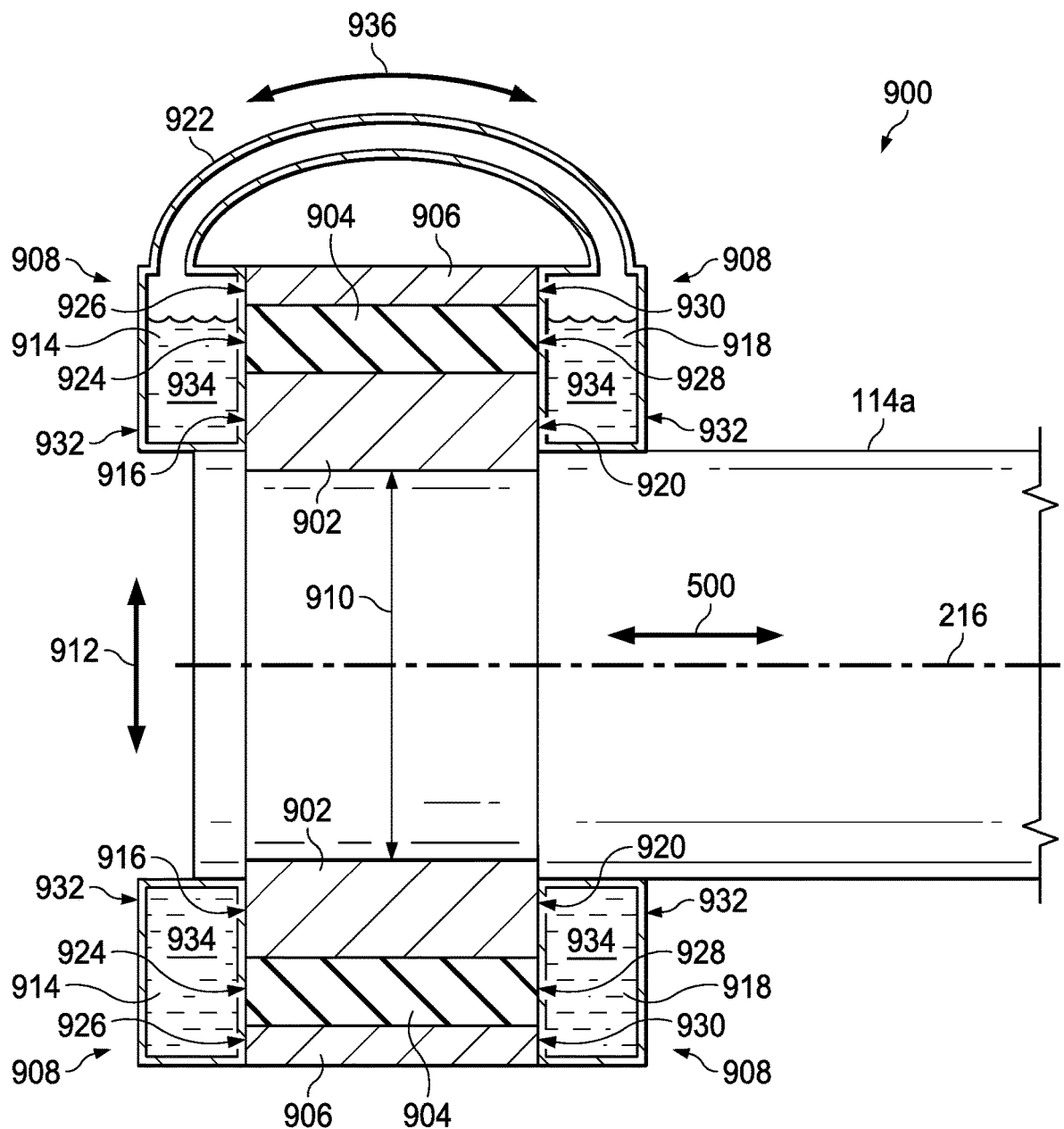
FIGS. 9A-9D depict a hydraulic vibratory motion reduction system in accordance with several embodiments of the present invention.
Figure 9B:
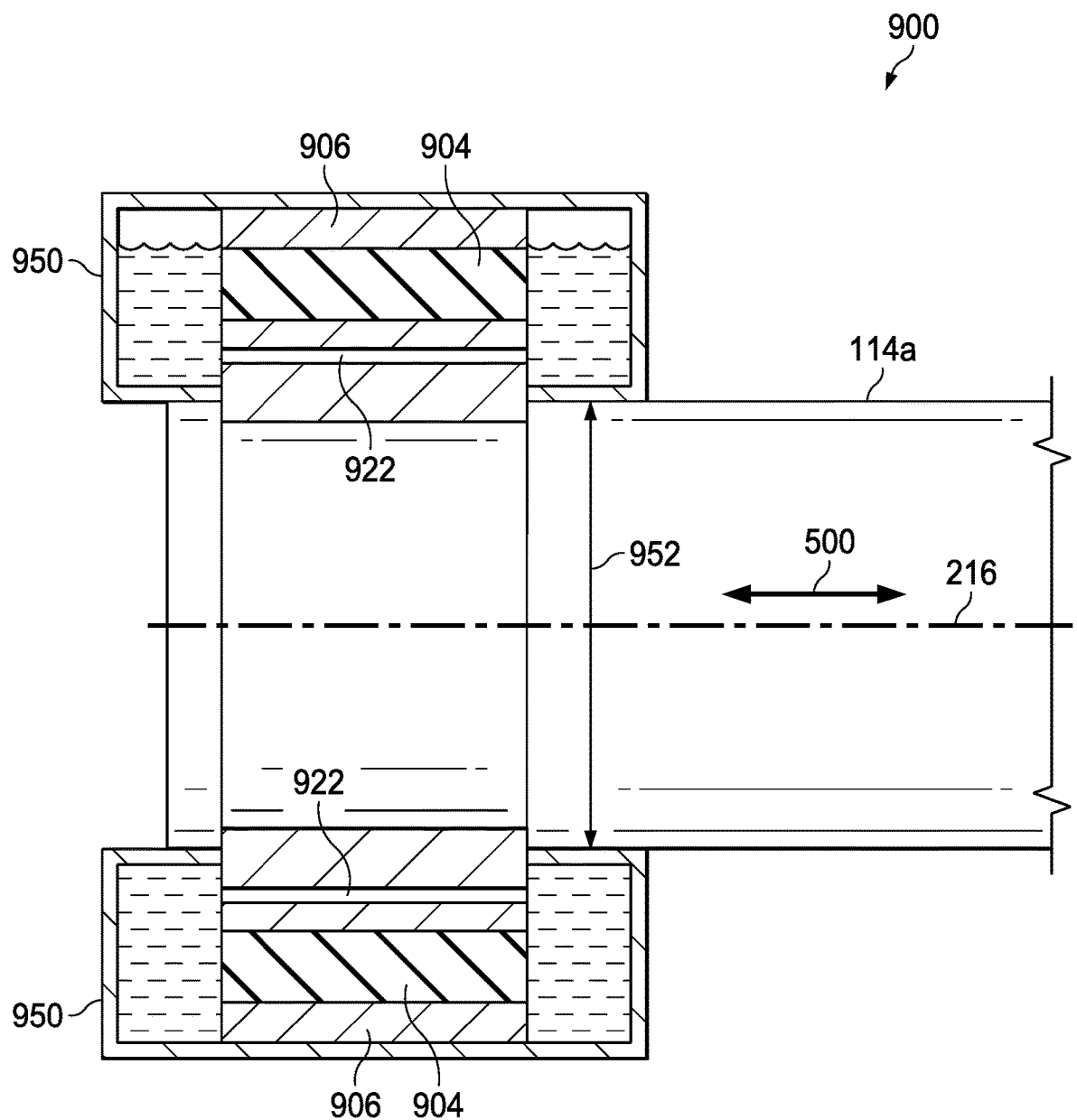
Figure 9C:
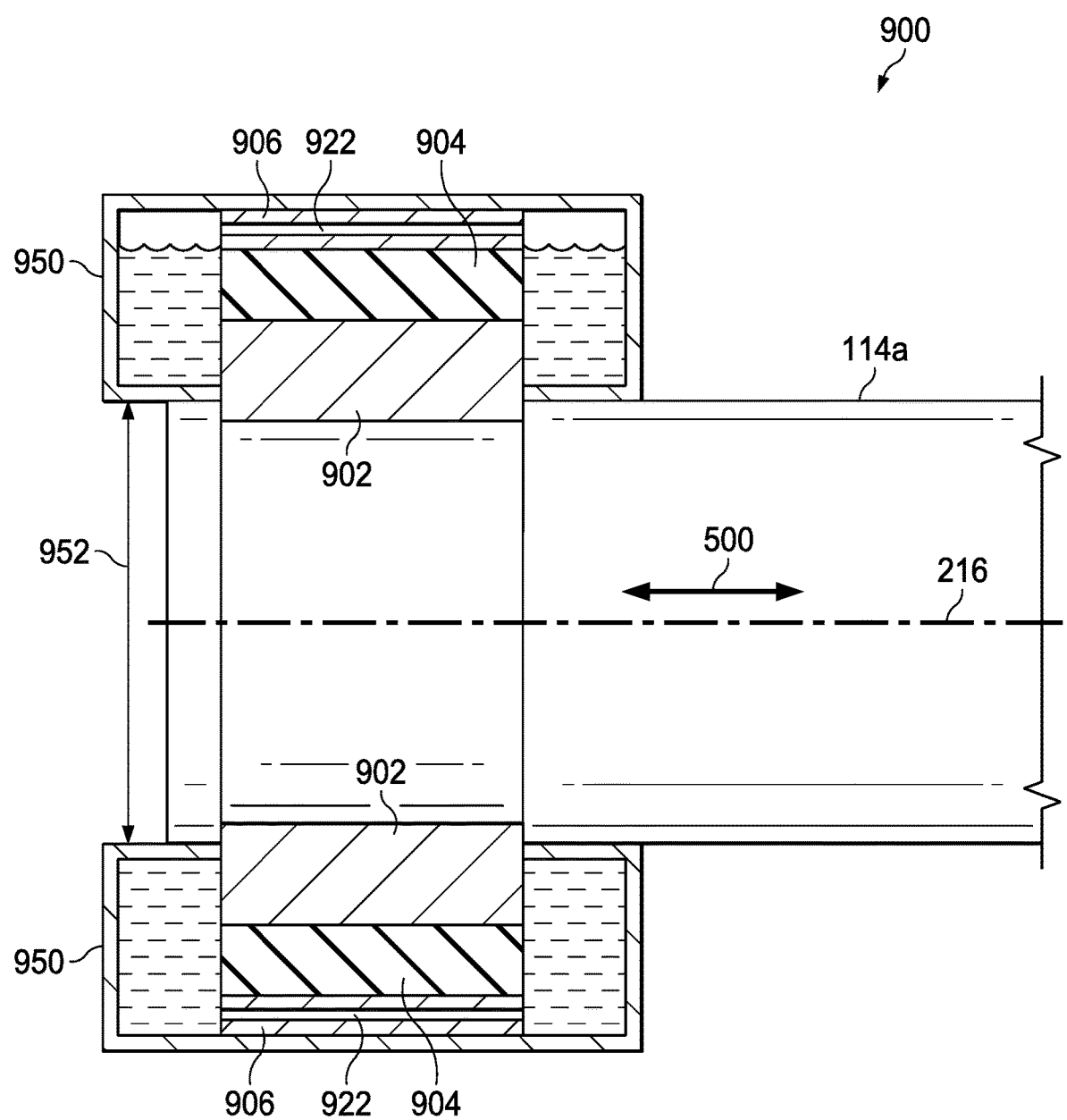
Figure 9D:
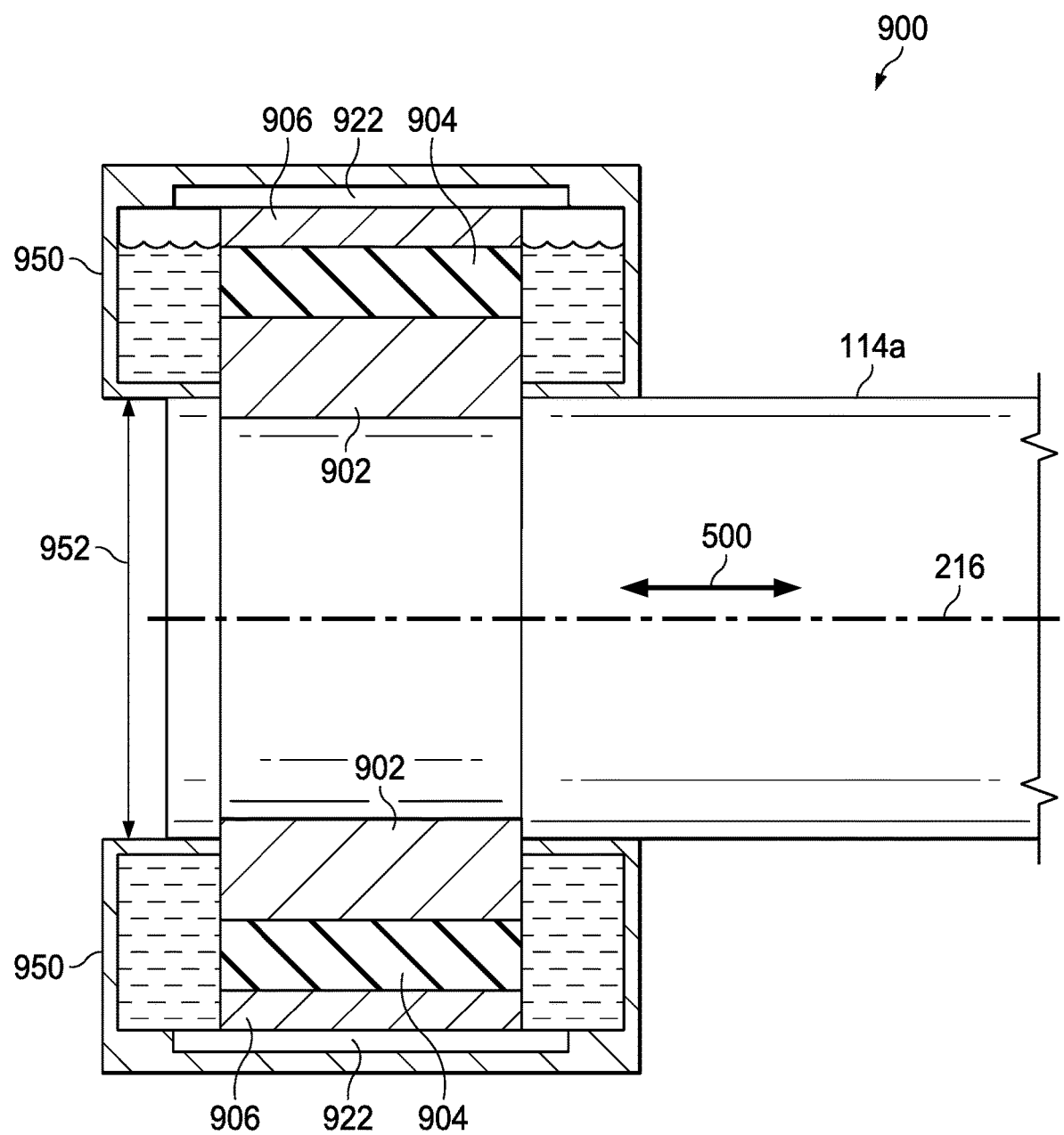
Figure 10A:
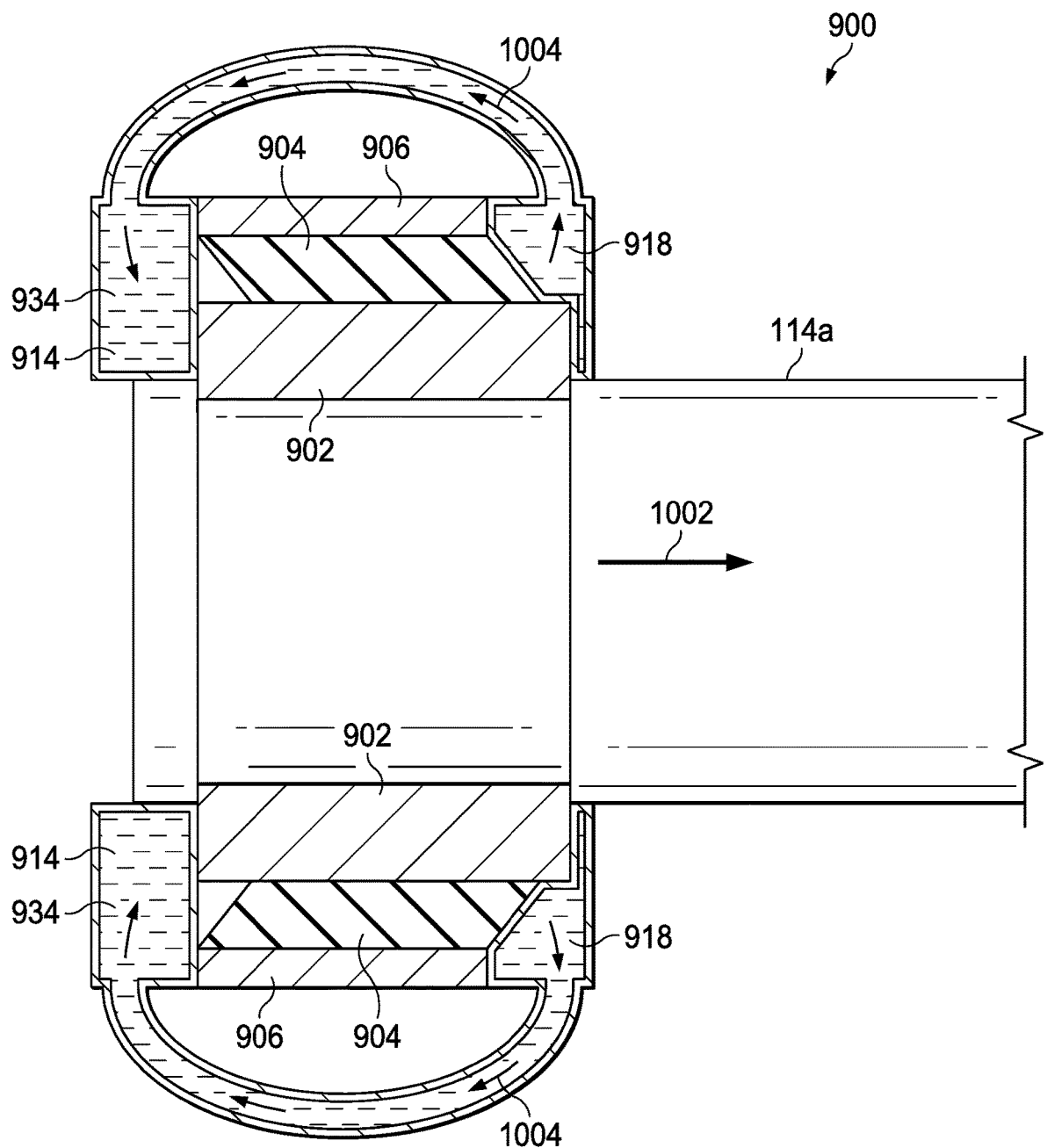
FIGS. 10A-10C illustrate the operation of the vibratory motion reduction system in accordance with several embodiments of the present invention.
Figure 10B:
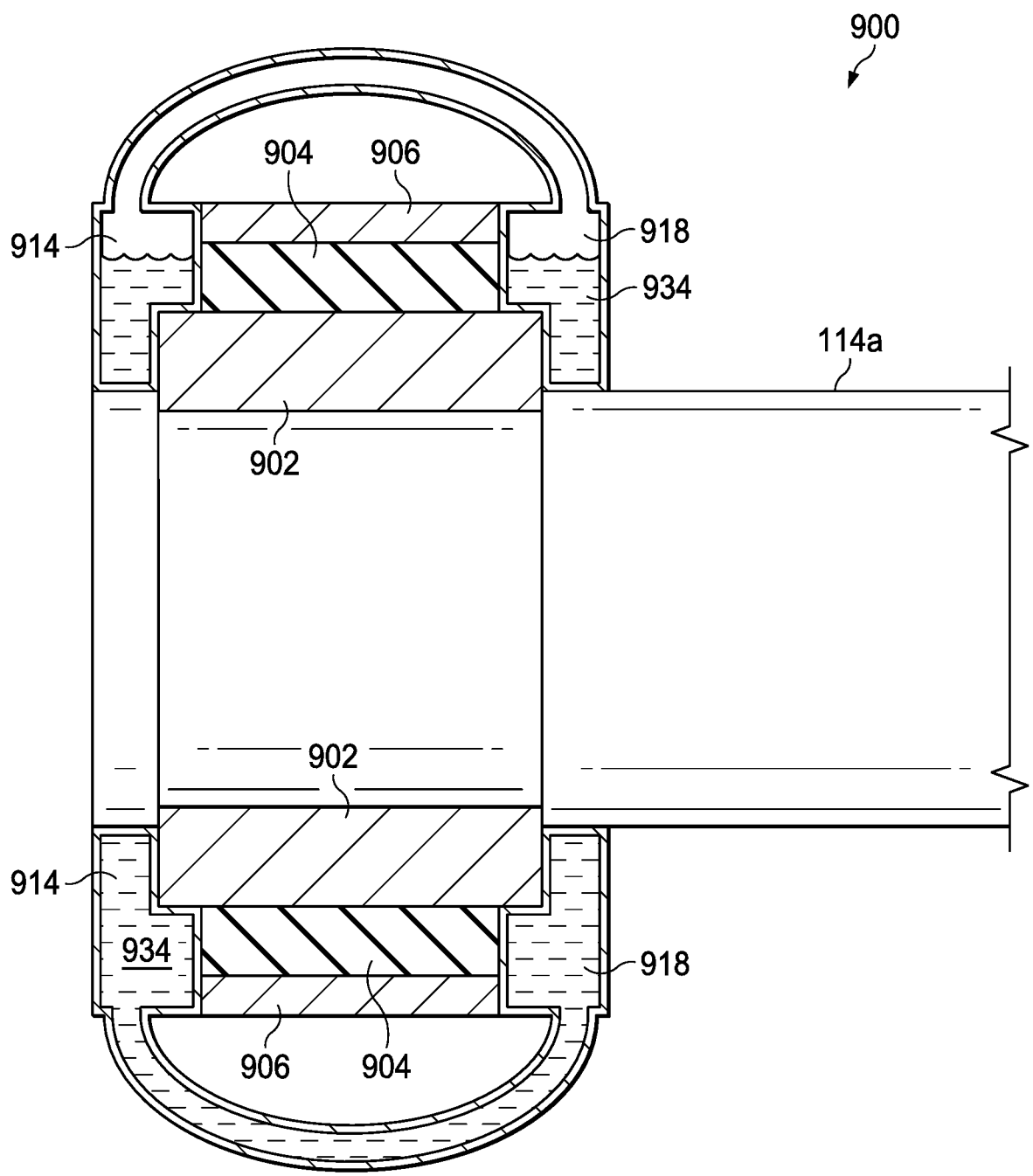
Figure 10C:
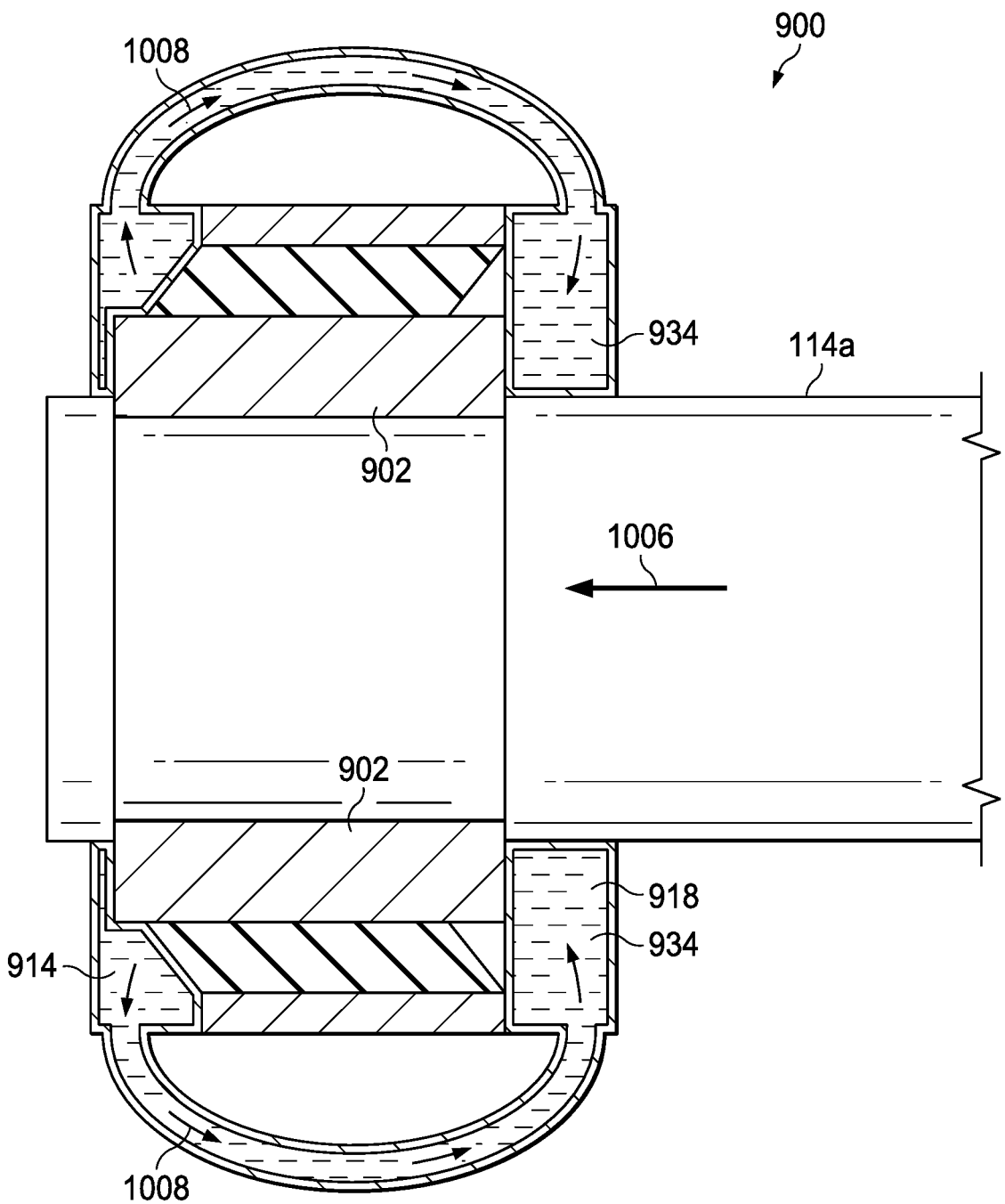

As illustrated in FIGS. 9B-9C, the vibratory motion reduction system 900 can also include a housing 950 that is attached to the outer member 906, encloses the tuning mass 908 (i.e., first chamber 914, second chamber 918, tuning port 922 and tuning fluid 934 as labeled in FIG. 9A) and the spring member 904, and partially encloses the inner member 902. The housing 950 has an opening 952 extending therein that does to not interfere with the vibratory motion 500 of the pylon assembly 114a. The housing 950 can be configured to replace a non-vibration reduction circular bearing assembly. Moreover, the housing 950 can be configured for mounting on a base, within a pedestal or as a cartridge. Note also, that the outer member 906 can be part of a housing having an opening extending therein that does to not interfere with the vibratory motion 500 of the pylon assembly 114a such that the housing encloses the tuning mass 908 and the spring member 904, and partially encloses the inner member 902.

Now referring to FIGS. 10A-10C, the operation of the vibratory motion reduction system 900 is illustrated to show tuning fluid 934 being pumped back-and-forth between the first and second chambers 914, 918 due to the relative motion between the pylon assembly 114a and the inboard tip rib 506 (FIG. 6). As shown in FIG. 10A, outboard lateral motion 1002 of the pylon assembly 114a causes the inner member 902 to compress at least the portion of the second chamber 918 while simultaneously decompressing at least the portion of the first chamber 914 causing tuning fluid 934 to flow or be pumped from the second chamber 918 into the first chamber 914 via tuning port 922 as indicated by arrows 1004. As shown in FIG. 10B, the tuning fluid 934 is approximately equally disposed between the first chamber 914 and the second chamber 918, and the spring member 904 is in a neutral position when there is no vibratory motion of the pylon assembly 114a. As shown in FIG. 10C, inboard lateral motion 1006 of the pylon assembly 114a causes the inner member 902 to compress at least a portion of the first chamber 914 while simultaneously decompressing at least a portion of the second chamber 918 causing tuning fluid 934 to flow or be pumped from the first chamber 914 into the second chamber 918 via tuning port 922 as indicated by arrows 1008.

Figure 11:
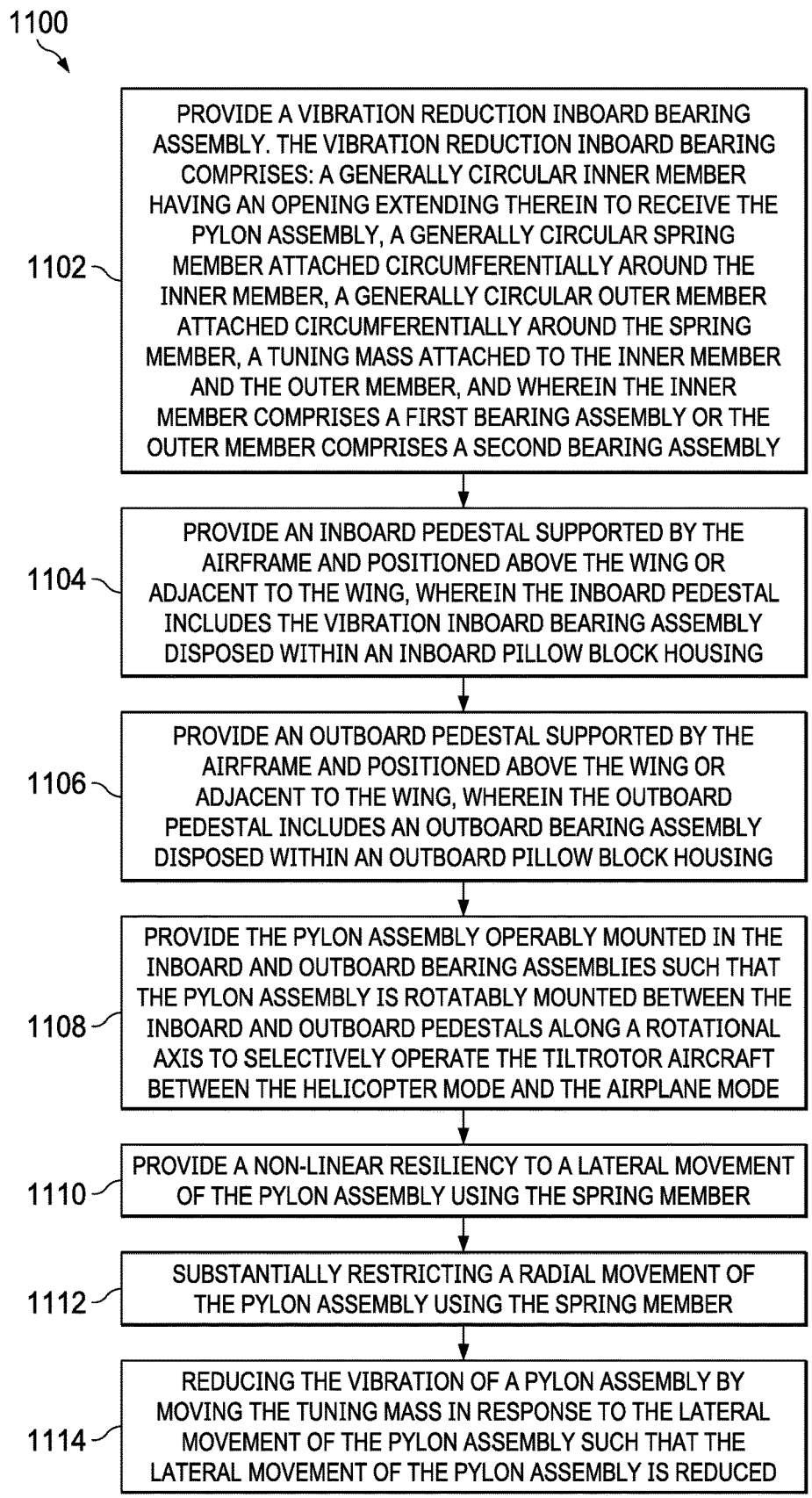
FIG. 11 is a block diagram illustrating a method of reducing a vibratory motion of a pylon assembly of a tiltrotor aircraft.

Referring now to FIG. 11, a method 1100 of reducing a vibratory motion of a pylon assembly of a tiltrotor aircraft having a helicopter mode and an airplane mode in which the tiltrotor aircraft has an airframe including a fuselage and a wing is shown. An inboard pedestal supported by the airframe and positioned above the wing or adjacent to the wing is provided in block 1102, wherein the inboard pedestal includes an inboard bearing assembly. An outboard pedestal supported by the airframe and positioned above the wing or adjacent to the wing is provided in block 1104, wherein the outboard pedestal includes an outboard bearing assembly, and the outboard pedestal or a portion of the outboard pedestal has a stiffness represented by a spring constant. The pylon assembly operably mounted in the inboard and outboard bearing assemblies is provided in block 1106 such that the pylon assembly is rotatably mounted between the inboard and outboard pedestals along a rotational axis to selectively operate the tiltrotor aircraft between the helicopter mode and the airplane mode. A tuning mass coupled to the inboard pedestal and the pylon assembly is provided in block 1108. The vibratory motion the pylon assembly is reduced in block 1110 using the tuning mass and the stiffness of the outboard pedestal or the portion of the outboard pedestal.

In one aspect, the method further comprises configuring the tuning mass and the stiffness of the outboard pedestal or the portion of the outboard pedestal to reduce the vibratory motion of the pylon assembly. In another aspect, the method further comprises: determining the spring constant; and adjusting the tuning mass to reduce the vibratory motion the pylon assembly based on the spring constant. In another aspect, the tuning mass comprises a mechanical system, a hydraulic system or combination thereof. In another aspect, the inboard bearing assembly comprises: an inner member having an opening extending therein that receives the pylon assembly; an outer member moveably attached to the inner member; the tuning mass attached to the inner member and the outer member such that the vibratory motion of the pylon assembly accelerates the tuning mass; and the inner member comprises a first bearing assembly or the outer member comprises a second bearing assembly. In another aspect, a flexible member is attached between the inner member and the outer member. In another aspect, the flexible member comprises an elastomer layer, a journal bearing or a plurality of resilient elements. In another aspect, the tuning mass comprises: a first chamber disposed adjacent to a first side of the inner member; a second chamber disposed adjacent to a second side of the inner member; a tuning port connecting the first chamber to the second chamber; a tuning fluid disposed within the first chamber and the second chamber; and the vibratory motion of the pylon assembly causes the inner member to compress at least a portion of the first chamber while simultaneously decompressing at least a portion of the second chamber, or compress at least the portion of the second chamber while simultaneously decompressing at least the portion of the first chamber. In another aspect, the tuning port extends through the inner member or the outer member. In another aspect, the tuning port is disposed within a housing or external to the housing. In another aspect, the first chamber is further disposed adjacent to a first side of the outer member; and the second chamber is further disposed adjacent to a second side of the outer member. In another aspect, a housing has a opening extending therein that does to not interfere with the vibratory motion of the pylon assembly, wherein the housing is attached to the outer member, encloses the tuning mass, and partially encloses the inner member. In another aspect, the outer member comprises a housing having an opening extending therein that does to not interfere with the vibratory motion of the pylon assembly, and the housing encloses the tuning mass, and partially encloses the inner member.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device or system, the method being employed to determine the value, or the variation that exists among the fastener subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices, systems and/or methods disclosed and claimed herein can be made and executed without undue experimentation in light of the present disclosure. While the devices, systems and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A pedestal assembly for receiving a pylon assembly of a tiltrotor aircraft having a helicopter mode and an airplane mode, the tiltrotor aircraft having an airframe including a fuselage and a wing, the pedestal assembly comprising:
   an inboard pedestal supported by the airframe and positioned above the wing or adjacent to the wing, the inboard pedestal includes an inboard bearing assembly;
   an outboard pedestal supported by the airframe and positioned above the wing or adjacent to the wing, the outboard pedestal includes an outboard bearing assembly;
   the inboard and outboard bearing assemblies are operable to receive the pylon assembly therein such that the pylon assembly is rotatably mounted between the inboard and outboard pedestals along a rotational axis to selectively operate the tiltrotor aircraft between the helicopter mode and the airplane mode;
   the inboard bearing assembly comprising an inner member having an opening therein that receives the pylon assembly, an outer member moveably attached to the inner member, a tuning mass attached to the inner member and the outer member such that the vibratory motion of the pylon assembly accelerates the tuning mass, and the inner member comprises a first bearing assembly or the outer member comprises a second bearing assembly;
   the outboard pedestal or a portion of the outboard pedestal has a stiffness represented by a spring constant; and
   the tuning mass comprises a first chamber disposed around a first portion of the pylon assembly adjacent to a first side of the inner member, a second chamber disposed around a second portion of the pylon assembly adjacent to a second side of the inner member, a tuning port connecting the first chamber to the second chamber, and a tuning fluid disposed within the first chamber and the second chamber, wherein the tuning mass and stiffness of the outboard pedestal or the portion of the outboard pedestal reduce the vibratory motion of the pylon assembly.

2. The pedestal assembly of claim 1, wherein the tuning mass comprises a mechanical system, a hydraulic system or combination thereof.

3. The pedestal assembly of claim 1, further comprising a flexible member attached between the inner member and the outer member.

4. The pedestal assembly of claim 3, wherein the flexible member comprises an elastomer layer, a journal bearing or a plurality of resilient elements.

5. The pedestal assembly of claim 1, wherein:
   the vibratory motion of the pylon assembly causes the inner member to compress at least a portion of the first chamber while simultaneously decompressing at least a portion of the second chamber, or compress at least the portion of the second chamber while simultaneously decompressing at least the portion of the first chamber.

6. The pedestal assembly of claim 1, wherein the tuning port extends internally through the inner member or the outer member and is not external to the inner member or the outer member.

7. The pedestal assembly of claim 1, wherein the tuning port is disposed within a housing or external to the housing.

8. The pedestal assembly of claim 1, wherein:
   the first chamber is further disposed adjacent to a first side of the outer member; and
   the second chamber is further disposed adjacent to a second side of the outer member.

9. The pedestal assembly of claim 1, further comprising a housing having an opening extending therein that does to not interfere with the vibratory motion of the pylon assembly, wherein the housing is attached to the outer member, encloses the tuning mass and partially encloses the inner member.

10. The pedestal assembly of claim 1, wherein the outer member comprises a housing having an opening extending therein that does to not interfere with the vibratory motion of the pylon assembly, and the housing encloses the tuning mass and partially encloses the inner member.

11. A method of reducing a vibratory motion of a pylon assembly of a tiltrotor aircraft having a helicopter mode and an airplane mode, the tiltrotor aircraft having an airframe including a fuselage and a wing, the method comprising:
   providing an inboard pedestal supported by the airframe and positioned above the wing or adjacent to the wing, wherein the inboard pedestal includes an inboard bearing assembly comprising an inner member having an opening therein that receives the pylon assembly, an outer member moveably attached to the inner member, and the inner member comprises a first bearing assembly or the outer member comprises a second bearing assembly;
   providing an outboard pedestal supported by the airframe and positioned above the wing or adjacent to the wing, wherein the outboard pedestal includes an outboard bearing assembly, and the outboard pedestal or a portion of the outboard pedestal has a stiffness represented by a spring constant;
   providing the pylon assembly operably mounted in the inboard and outboard bearing assemblies such that the pylon assembly is rotatably mounted between the inboard and outboard pedestals along a rotational axis to selectively operate the tiltrotor aircraft between the helicopter mode and the airplane mode;

providing a tuning mass attached to the inner member and the outer member of the inboard bearing assembly, wherein the tuning mass comprises a first chamber disposed around a first portion of the pylon assembly adjacent to a first side of the inner member, a second chamber disposed around a second portion of the pylon assembly adjacent to a second side of the inner member, a tuning port connecting the first chamber to the second chamber, and a tuning fluid disposed within the first chamber and the second chamber; and reducing the vibratory motion the pylon assembly using the tuning mass and the stiffness of the outboard pedestal or the portion of the outboard pedestal.

12. The method of claim 11, further comprising configuring the tuning mass and the stiffness of the outboard pedestal or the portion of the outboard pedestal to reduce the vibratory motion of the pylon assembly.

13. The method of claim 11, further comprising:
determining the spring constant; and
adjusting the tuning mass to reduce the vibratory motion the pylon assembly based on the spring constant.

* * * * *